J. G. VINCENT.
ADDING MACHINE.
APPLICATION FILED DEC. 29, 1905.
1,054,154.
Patented Feb. 25, 1913.
2 SHEETS—SHEET 1.
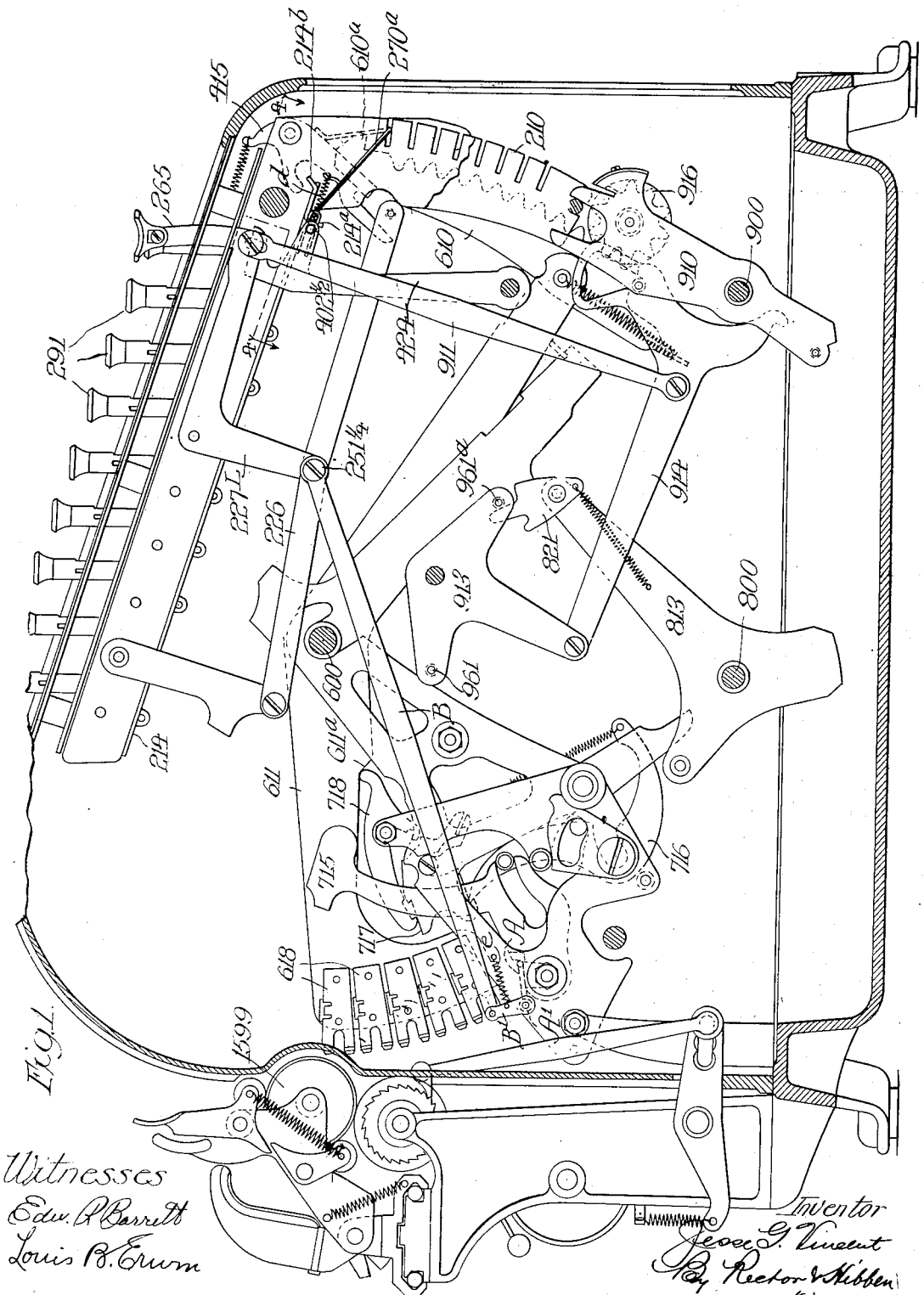

J. G. VINCENT.
ADDING MACHINE.
APPLICATION FILED DEC. 29, 1905.
1,054,154.
Patented Feb. 25, 1913.
2 SHEETS—SHEET 2.
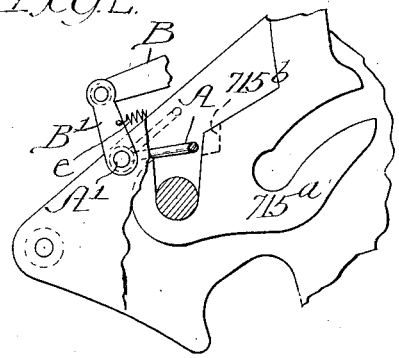
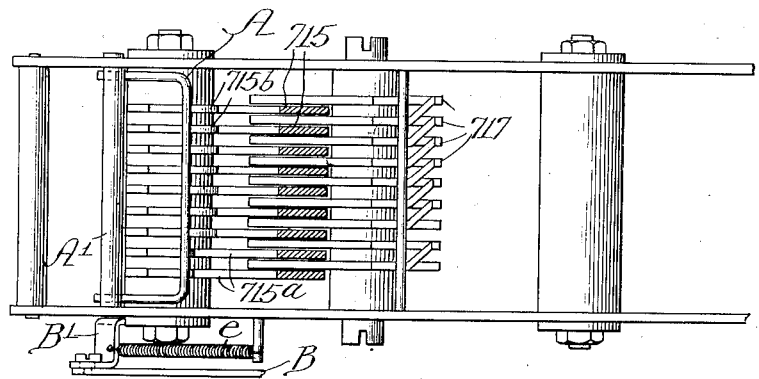
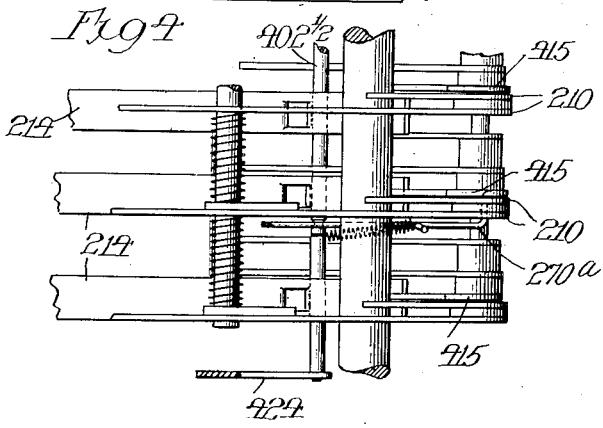
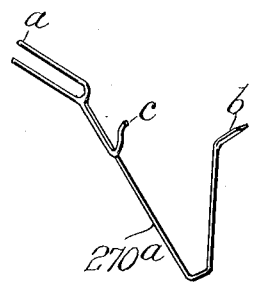
Witnesses
Edw. P. Barrett
Louis B. Erwin
Inventor
Jesse G. Vincent
By Rector & Nibben
His Attys.

UNITED STATES PATENT OFFICE.

JESSE G. VINCENT, OF DETROIT, MICHIGAN, ASSIGNOR TO BURROUGHS ADDING MACHINE COMPANY, OF DETROIT, MICHIGAN, A CORPORATION OF MICHIGAN.

ADDING-MACHINE.

1,054,154.   Specification of Letters Patent.   Patented Feb. 25, 1913.

Application filed December 29, 1905. Serial No. 293,845.

*To all whom it may concern:*

Be it known that I, JESSE G. VINCENT, a citizen of the United States, residing at Detroit, in the county of Wayne and State of Michigan, have invented certain new and useful Improvements in Adding-Machines, of which the following is a specification.

My invention relates to adding machines which are adapted to accumulate and list individual items and to print the total thereof at the will of the operator and the object of my invention is to provide such machine with means for registering or keeping count of the number of checks or items put through the machine corresponding to the number of times that the machine is operated for the individual items and to record or print the total of the number of such checks or items at the will of the operator. In the present instance and by preference the arrangement is such that the total accumulated by such registering means or counter is automatically printed by the act of taking a regular total (sub-total or grand total) on the machine proper so that the number of checks or items comprised in such regular total is printed simultaneously with and at one side of such regular total. To distinguish the two different characters of totals, that is the regular total and the item total, suitable means may be employed, as for instance the printing mechanisms concerned in the printing of such totals may be provided with a polychrome ribbon, whereby the totals are printed in contrasting colors.

My invention has application to that class of machines exemplified by the well known Burroughs adding machine made in substantial accordance with Burroughs's Patents Nos. 504,963 and 505,078, issued on September 12, 1893, but it will be understood that my invention is not limited in its application or scope to machines of this type or make, but that it may be employed in other machines used for the same general purposes. Moreover, for convenience in description and illustration of my invention, I have chosen to show the same applied to a Burroughs machine and will hereinafter describe the same in that connection without intention of limiting myself thereto.

In the drawings Figure 1 is a left hand side elevation of a Burroughs machine but omitting parts which are unnecessary for an understanding of my invention; Fig. 2 a detail view of a portion of the printing mechanism; Fig. 3 a plan view of the printing mechanism, but illustrating the hammers in section; Fig. 4 a sectional plan view (on line 4—4 of Fig. 1) of a portion of the forward end of the machine illustrating the action of some of the parts constituting my improvements or attachments; and Fig. 5 a view in perspective of one of the operating connections forming one of the parts of my attachment.

As hereinbefore stated, I have shown my invention as applied to a Burroughs adding machine and in addition I have chosen to utilize certain portions of the accumulating mechanism and printing mechanism of such machine to serve as special accumulating and printing mechanism for the check or item counter and printer, although, as will be hereinafter understood, such special mechanism may be provided as an addition to a regular Burroughs machine. In the present instance I provide such special mechanism by utilizing the accumulating and printing mechanisms belonging to the first two rows of keys on the left hand side of the keyboard and so adapt them and put them under the control of the machine proper that they will accumulate "1" for each item put into the machine and, in the complete embodiment of my machine, I provide for automatically taking a total of this special accumulation in the act of taking the regular total. The employment of the accumulating and printing mechanisms corresponding to two denominations will afford a capacity of "99" but as will be obvious, the capacity may be increased by increasing the number of trains of such special mechanisms. The machine, thus modified, is adapted to accumulate the items in the regular way and also to keep a special accumulation of the number of times that the machine is operated with an item set up on the keyboard, which will correspond to the number of items or checks. Moreover, the machine is so modified and arranged that the printing mechanism now serving as a special printing mechanism will be rendered inoperative, so as not to print "1" with each item, but will accumulate "1" every time that an item is put through the machine, but such special printing mechanism will be rendered operative whenever the totalizing mechanism of the regular machine is set or operated, with the result that the accumulation on the special accumulating mechanism will be printed automatically and at one side of the total or sub-total printed by the regular printing mechanism of the machine. Furthermore, by employing a polychrome ribbon or two separate ribbons of contrasting colors for serving the regular and the special printing mechanisms, the two different totals may be printed in contrasting colors so that they may be readily distinguished one from the other. The Burroughs adding machine being so well known and being described in detail in said prior Burroughs patents, only those parts thereof more or less concerned in the operation of my improvements need be described. As usual, the keyboard of the machine is provided with a series of keys 291 arranged in rows corresponding to the different denominations increasing from right to left, the keys in each row representing the digits 1 to 9. These keys are arranged to be set or depressed according to the item to be accumulated and as a result of the depression of a key in any one of the rows, a sliding bar or plate 214, one for each row of keys, is moved rearwardly and at the same time a universal rod 402½ extending transversely of the machine is correspondingly moved rearwardly whenever any one of the series of sliding bars 214 is so moved, by reason of the contact of a depending lug 214ª on the operated sliding bar or bars. As is well known, this universal rod forms part of a bail having parallel side arms 424, the left hand one of which is illustrated in Fig. 1. Thus, the universal rod is moved rearwardly each time an item is set up on the keyboard.

The adding machine is provided with a series of main levers or sectors 611 which are hung or mounted to oscillate on the main cross shaft 600. These sectors carry at their rearward ends the series of movable type plates 618 and at their forward ends carry the racks 610. The degree of descent of the forward end of one sector 611 and its rack 610 is dependent upon the particular key operated or depressed in its corresponding row of keys and this result is accomplished by means of the movement of the stop wire 270, corresponding to the particular key so operated. As is well known, each stop wire is movable as to its forward and bent end in its proper slot formed in plates 210. When a key is operated the forward or bent end of its stop wire is drawn rearwardly and into the path of movement of the projection or shoulder 610ª of the rack corresponding to that series. For instance, if the "1" key is depressed the uppermost stop wire is operated, that is drawn rearwardly in its slot in the plates 210, with the result that the corresponding rack 610 will descend a distance corresponding to the "1" value. Each rack 610 has its individual retainer 415, which is normally in position to sustain and lock its rack, but adapted to be rocked rearwardly by contact of the upwardly projecting lug 214ᵇ on its corresponding sliding bar 214, so that its rack will be unlocked and be free to descend a distance corresponding to the value of the particular key depressed, as already described.

The racks 610 coöperate with a corresponding series of accumulating pinions 916, which are mounted to rock forwardly and rearwardly in a frame having end plates 910 mounted on an axis 900. The rocking of this frame during the operation of the machine is controlled by a pitman 914, with the result that in the accumulating operation the frame is rocked forwardly out of mesh with the racks which are then permitted to freely descend provided that any key in their corresponding row of keys has been operated and such frame is rocked rearwardly into mesh with the racks just prior to the ascent of the latter on the rearward or return stroke of the operating handle or main shaft of the machine, so that upon such ascent of the operated racks, the amount or value of the item is transferred to the accumulating pinions. This pitman, which thus controls the rocking or swinging of the pinion frame, is operated indirectly from the rock shaft 800 through the medium of the rock arm 813, wipe plate 821 and the three-armed lever 913, having the two studs 961 and 961ª with which the wipe plate directly coöperates.

In the taking of a total the pitman 914 is so controlled at the will of the operator that the rocking frame 910 is prevented from being rocked to carry the pinions out of mesh with their racks, with the result that the racks are permitted to descend distances corresponding to the accumulation on the pinions and the printing mechanism thereupon prints the accumulation. If the total is to be a grand total, the totalizing mechanism is left in set or operated position, whereupon, on the return stroke of the operating handle or main shaft of the machine the pinion frame is rocked to carry the pinions out of mesh with the racks and thus left at zero, but if the total is to be a sub-total, the totalizing mechanism is released at the end of the forward operating stroke of the handle and the pinions thereby left in mesh with the racks which will thereby re-transfer the accumulation to the pinions. In the machine herein shown, the pitman is controlled in the totaling operation by means of a total key 265, which is operatively connected with such pitman by means of a long link 911, whereby the forward end of the pitman may be lowered by the operation of depressing the total key.

The printing mechanism comprises a series of hammers 715, one for each sector 611 and adapted to strike the forward end of any one of the type plates presented to it and thereby make an impression upon the paper carried by the platen 1599. Each hammer has its separate driver 716, by which it is operated or driven, but each hammer is normally restrained by its latch 717 which is mounted to oscillate so as to release the driver and thereby operate the hammer. Each latch is under the control of a pawl 718 which, when its corresponding sector 611 is operated, is adapted to engage and rock its latch 717 and thereby operate its hammer. The series of pawls 718 are arranged in a rocking frame and engage their latches 717 only when their corresponding sectors have been operated, but those pawls 718 corresponding to sectors which have not been operated are rendered inoperative as to the tripping of their latches 717 by being rocked upwardly by contact of their tails with the inclined shoulder 611ª of their sectors so as to clear a shoulder on the upper edge of their latches. The latches are as usual formed with overlapping tails so that all latches to the right of the one associated with the bank of keys in which one has been depressed for the highest decimal place in an amount to be printed, will be tripped whether or not a key is depressed in a right-hand bank for a lower decimal place. This automatic tripping of latches is provided for in order to have ciphers printed in all decimal places to the right of the highest one wherever the amount calls for no digits.

As hereinbefore stated, I modify and adapt the accumulating mechanism and printing mechanism corresponding to the first two denominations on the left hand side of the keyboard for the purposes of my invention, whereby the number of items put through the machine may be accumulated and the total thereof printed at the same time that the regular total on the machine is printed. According to the present described construction, that is one in which the accumulating and printing mechanisms of the first two denominations counting from the left of the keyboard are employed, I obtain a "99 capacity" but it will be understood that the capacity may be increased either by including more of the regular mechanisms corresponding to the denominations to the right or similar trains of such mechanism may be provided on the left of the regular machine. Or, as hereinbefore suggested, special accumulating and printing mechanisms corresponding in general structure to the regular mechanisms may be provided at the left hand side of the adding machine proper.

Describing the present embodiment of my invention as herein illustrated, I provide a special stop wire 270ª arranged to operate in the uppermost or number 1 slots of the plates 210 corresponding with the column of the counter section in which I wish to accumulate units, which column, in the present instance, corresponds with the second row of keys from the left hand side of the keyboard. It will be understood that the regular stop wire is removed and the remaining stop wires corresponding to that denomination are unnecessary. This special stop wire is placed under the control of some part of the regular machine which is operated whenever an item is set up on the keyboard and for this purpose I take advantage of the fact that the universal rod 402½ is operated or moved whenever an item is set up on the keyboard, whether the item contains one or more digits. To this end, the special stop wire is made of the peculiar shape illustrated in perspective in Fig. 5, in which such wire is shown as provided at its rearward end with a fork $a$ adapted to fit over the universal rod 402½ at a point between the first and second denominations, counting from the left of the keyboard, such rod being grooved, as shown in Fig. 4, so as to hold such end of the special stop wire in proper position. This stop wire is bent at its forward end laterally and upwardly so as to form an upright portion $b$ which is arranged to press against the forward edge of the retainer 415 corresponding with the particular plates 210 with which the special stop wire coöperates. This special stop wire is also provided with a projecting portion $c$ forming a point of attachment for one end of a spring $d$, whose other end is secured to the universal rod 402½. This spring forms a flexible connection between such rod and the special stop wire with the result that when the universal rod is moved rearwardly in the manner already explained, said special stop wire is also moved rearwardly, thereby forming a stop for the rack 610 in the number "1" slot. At the same time, by reason of the contact of the portion $b$ of the special stop wire against the corresponding retainer 415, such retainer is rocked so as to release its rack and permit the same to descend until stopped by such special stop wire. The parts are thus set or put under such conditions that "1" may be accumulated when the machine is operated in the usual manner and will cause "1" to be printed opposite each item according to the construction thus far described, although as hereinafter explained, special mechanism is provided for preventing the "1" from being thus printed when the items are being listed, but permitting only the total of the number of the items to be printed in connection with and opposite the regular total printed by the machine. It will be understood that the machine is split between the second and third denominations, counting from the left, as indicated in Fig. 3, so that the hammer action will not be transferred from the left hand section of the keyboard, which is operating as the item counter, to the right hand section thereof, which is operating as a regular machine, and consequently no ciphers will be printed in the right hand section to the left of the item. The so-called split is effected by simply omitting the tail from the second latch to the right as clearly shown in Fig. 3.

When the operated keys are restored and the sliding bars 214 return to their normal position, the universal rod 402½ is likewise restored to its normal forward position in the well known manner and as a result the special stop wire is moved to its normal position illustrated in Fig. 1, ready for the next operation. However, in many cases, it is desirable that the "1's" accumulated by the special mechanism which is keeping count of the number of checks or items should not be printed and to that end I provide mechanism which normally prevents action of the printing mechanism corresponding to said two denominations which are here utilized for the special purpose of counting or accumulating the number of items. In the present instance, an interference, under the control of the totalizing mechanism, is provided for interfering with the action of the hammers corresponding to such special mechanism, with the rsult that those hammers are prevented from delivering their blows during the accumulating and listing of items, but are permitted to operate and deliver their blows in the ordinary manner and thereby cause the special total to be printed whenever the totalizing mechanism of the machine is set and the machine operated for the taking of a total. This interference comprises a bail A shown more particularly in Figs. 2 and 3 and secured at its ends to a rock shaft $A^1$ which is operatively connected with the totalizing mechanism through the link B, whose rearward end is pivotally connected with the crank arm $B^1$ secured to said rock shaft $A^1$ and whose forward end is operatively connected to the same stud 251¼ which forms the pivotal connection between the bell crank $227^L$ and the link 226 of the regular Burroughs machine. This bail is normally held in a position of interference with a yielding pressure, as by means of the coiled spring $e$ connected to the crank arm $B^1$. Moreover, in order that the bail may be caused to interfere only with the special hammers marked $715^a$ without interfering with the action of the regular hammers 715 at any time, such regular hammers are cut back at $715^b$, while the special hammers are left of the usual construction. The result of this arrangement is such that when the bail is in its normal or interfering position, the special hammers will be arrested in their rearward movement and prevented from delivering a blow, whereas the regular hammers will be operated in the usual manner, inasmuch as the bail cannot interfere with their action, because of the provision of said cut-away portion thereon. By reason of the connection between said interference and the totalizing mechanism of the machine, the bail is rocked or swung upwardly to an inoperative position, as illustrated in dotted lines in Fig. 2, it being understood that when the total key 265 is depressed and the bell crank $227^L$ rocked in a clockwise direction, the link B is reciprocated rearwardly and the shaft $A^1$ rocked in an anti-clockwise direction, thereby elevating the bail A to an inoperative position, that is a position to clear the shoulders on the special hammers. When the total key is thus set or depressed for the taking of a total, either sub-total or grand total, the special hammers are permitted to operate in the same manner as the regular hammers and the special total or accumulation is printed at one side of the regular total and in an automatic manner and as an incident to the taking of such regular total.

I claim:

1. In an adding machine, the combination with a set of wheels adapted to display accumulations of various amounts, and means for differentially turning said wheels; of one or more wheels in line therewith adapted to display alongside the accumulation an amount representing the number of times the first mentioned wheels have been operated to produce such accumulation, and means for turning said counting wheel one step in each accumulating operation of the first mentioned wheels, and means for automatically rendering said turning means effective as an incident to such accumulating operation.

2. In an adding machine, the combination with devices for accumulating various amounts and clearing mechanism, of a counter for showing the number of operations of said devices in effecting an accumulation, means released by said devices for operating said counter, and means for taking an imprint of the count at will under control of the clearing mechanism.

3. In an adding machine, the combination, with the accumulating, printing and totalizing mechanisms thereof, of means for accumulating and visually indicating the number of items listed, the said means being under the control of the totalizing mechanism of the machine as to printing action, and under control of the accumulating mechanism as to counting action.

4. In an adding machine, the combination, with the accumulating, printing and totalizing mechanisms thereof, of means for accumulating and visually indicating the number of items listed and including a printing device controlled by said totalizing mechanism and arranged to print a total of the number of items whenever a total of the items is printed by said printing mechanism, said means under control of the accumulating mechanism as to counting action.

5. In an adding machine, the combination, with the accumulating, printing and totalizing mechanisms thereof, of means for accumulating the number of items listed and including visual indicating wheels and a printing device controlled by said totalizing mechanism and arranged to print a total of the number of the items at one side of total of the items as printed by said printing mechanism, said means under control of the accumulating mechanism as to counting action.

6. In an adding machine, the combination, with the accumulating, printing and totalizing mechanisms thereof, of a special printing device and visual accumulating wheels arranged to accumulate "1" for each item accumulated and to print the total of the number of such items, and means for turning said wheels automatically rendered effective by setting of the accumulating mechanism.

7. In an adding machine, the combination, with the accumulating, printing and totalizing mechanism thereof, of special printing and accumulating devices arranged to accumulate "1" for each item accumulated and an operating connection between the said totalizing mechanism and the printing device for controlling the latter, and means for turning said wheels automatically rendered effective by setting of the accumulating mechanism.

8. In an adding machine, the combination, with the accumulating, printing and totalizing mechanism thereof, of special printing and accumulating devices arranged to accumulate "1" for each item accumulated, said special printing device being normally inoperative, and a connection between said totalizing mechanism and the printing device for rendering the same operative.

9. In an adding machine, the combination, with the accumulating, printing and totalizing mechanisms thereof, of special printing and accumulating devices arranged to accumulate "1" for each item accumulated, an interference normally preventing operation of said special printing device, and a connection between said totalizing mechanism and the printing device for removing the interference and thereby permit the special printing device to print whenever the totalizing mechanism is operated.

10. In an adding machine, the combination, with the accumulating, printing and totalizing mechanism thereof, of special printing and accumulating devices arranged to accumulate "1" for each item accumulated, an interference normally spring-pressed to a position to interfere with the action of said special printing device, and a connection between said totalizing mechanism and the printing device for removing the interference to an inoperative position against its spring pressure and thereby permit the special printing device to print whenever the totalizing mechanism is operated.

11. In an adding machine, the combination, with the accumulating, printing and totalizing mechanisms thereof, of special printing and accumulating devices arranged to accumulate "1" for each item accumulated and to print the total of the number of such items, said printing mechanism and special printing device being arranged to print in contrasting colors.

12. In an adding machine, the combination, with the accumulating, printing and totalizing mechanisms thereof, of special printing and accumulating devices arranged to accumulate "1" for each item accumulated and to print the total of the number of such items, said special printing device including hammers, and means for preventing the action of such hammers except when the totalizing mechanism is operated.

13. In an adding machine, the combination, with the accumulating, printing and totalizing mechanisms thereof, of special printing and accumulating devices arranged to accumulate "1" for each item accumulated and to print the total of the number of such items, said special printing device including hammers, and means under the control of the totalizing mechanism for normally interfering with the action of the hammers.

14. In an adding machine, the combination, with the accumulating, printing and totalizing mechanisms thereof, of special printing and accumulating devices arranged to accumulate "1" for each item accumulated and to print the total of the number of such items, said special printing device including hammers, and an interference normally spring pressed into the path of movement of said hammers to prevent hammer action and under the control of said totalizing mechanism.

15. In an adding machine, the combination, with the accumulating, printing and totalizing mechanisms thereof, of special printing and accumulating devices arranged to accumulate "1" for each item accumulated and to print the total of the number of such items, said regular mechanism and said special printing device having hammers which are similar except that the regular hammers are cut away, and an interference normally arranged to arrest the special hammers without interfering with the regular hammers.

16. In an adding machine, the combination, with the accumulating, printing and totalizing mechanisms thereof, of special printing and accumulating devices arranged to accumulate "1" for each item accumulated and to print the total of the number of such items, said regular printing mechanism and said special printing device having hammers which are similar except that the regular hammers are cut away, and a bail normally spring pressed to a position in the path of the special hammer to arrest them without interfering with the movement of the regular hammers, and an operating connection between said bail and the totalizing mechanism for rocking said bail to an inoperative position as an incident to the operation of taking a total.

17. In an adding machine, the combination with sets of key elements and with the regular accumulating pinions and racks controlled in degree of movement by said sets of key elements individually, of special accumulating pinions and a special rack, said last named rack being under the control of said sets of key elements collectively.

18. In an adding machine, the combination with the key elements and with the regular accumulating pinions and racks controlled in degree of movement by the key elements, of special accumulating pinions and a special rack, and special stop mechanism controlled by the key elements and arranged to stop the special rack in position to cause an accumulation of "1" for each item accumulated in the machine.

19. In an adding machine, the combination with the key elements and with the regular accumulating pinions and racks controlled in degree of movement by the key elements, of special accumulating pinions and a special rack, special stop mechanism arranged to stop the special rack in position to cause an accumulation of "1" for each item accumulated in the machine, and an operating connection controlling said special stop mechanism and itself controlled by said key elements.

20. In an adding machine, the combination with the key elements and with the regular accumulating pinions and racks controlled in degree of movement by the key elements, of special accumulating pinions and a special rack, special stop mechanism arranged to stop the special rack in position to cause an accumulation of "1" for each item accumulated in the machine, and a universal rod common to all of the racks, said rod controlling the special stop mechanism and itself controlled by said key elements.

21. In an adding machine, the combination with the key elements and with the regular accumulating pinions and racks controlled in degree of movement by the key elements, of special accumulating pinions and a special rack, special stop mechanism comprising a stop wire arranged to be interposed in the path of the special rack, and a rod moved by the key elements whenever an item is set up on the machine, said rod being operatively connected with the stop wire.

22. In an adding machine, the combination with the key elements and with the regular accumulating pinions and racks controlled in degree of movement by the key elements, of special accumulating pinions and a special rack, special stop mechanism comprising a stop wire arranged to be interposed in the path of the special rack, a rod controlled by the key elements and a yielding connection between said rod and stop wire.

23. In an adding machine, the combination with the key elements and with the regular accumulating pinions and racks controlled in degree of movement by the key elements, of special accumulating pinions and a special rack, special stop mechanism comprising a stop wire arranged to be interposed in the path of the special rack, a universal rod swung by the setting of any one of the keys, and a spring connection between the rod and the stop wire.

24. In an adding machine, the combination with the key elements and with the regular accumulating pinions and racks controlled in degree of movement by the key elements, of special accumulating pinions and a special rack, special stop mechanism comprising a stop wire arranged to be interposed in the path of the special rack, a rod moved by the key elements whenever an item is set up on the machine, and operatively connected with the stop wire, and a retainer for normally holding the special rack and controlled by said stop wire.

25. In an adding machine, the combination with the key elements and with the regular accumulating pinions and racks controlled in degree of movement by the key elements, of special accumulating pinions and a special rack, a rod moved by the key elements whenever an item is set up on the machine, a stop wire arranged to be interposed in the path of movement of the special rack and having a forked end to embrace said rod, and a spring connection between the rod and the stop wire.

26. In an adding machine, the combination with the key elements and with the regular accumulating pinions and racks controlled in degree of movement by the key elements, of special accumulating pinions and a special rack, a rod moved by the key elements whenever an item is set up on the machine, a stop wire arranged to be interposed in the path of movement of the special rack and having a forked end to embrace said rod, said stop wire being operatively connected with the rod and having a free end, and a retainer for said special rack controlled by said free end of the stop wire.

27. In an adding machine, the combination with the key elements and with the regular accumulating pinions and racks controlled in degree of movement by the key elements, of special accumulating pinions and a special rack, a rod moved by the key elements whenever an item is set up on the machine, a stop wire arranged to be interposed in the path of movement of the special rack and having a forked end to embrace said rod, said stop wire having a projection $c$ and a free end $b$, a spring connecting said projection $c$ with the rod, and a retainer for said special rack contacted and actuated by said free end $b$ of the stop wire.

28. In an adding machine, the combination, with the key elements and the accumulating, printing and totalizing mechanisms thereof, of a special accumulating and printing device under the control of the key elements, and means controlled by the totalizing mechanism and in position to prevent printing action of the special printing device but movable automatically by the setting of the totalizing mechanism to permit printing action of the special printing device in the taking of a total.

29. In an adding machine, the combination, with the key elements and the accumulating, printing and totalizing mechanisms thereof, of a special accumulating and printing device under the control of the key elements, the regular printing mechanism and special printing device including hammers, a bail in position to prevent the action of the hammers of the special printing device, a rock arm connected with the bail, a crank arm on such rock arm, and a link connection between the crank arm and the totalizing mechanism, whereby the bail is rocked to an inoperative position when the totalizing mechanism is set for the taking of a total.

30. In an adding machine, separate accumulators, one arranged to accumulate the total of the items and the other to accumulate the numbers of the items, separate printing mechanisms for the separate accumulators, the printing mechanism for the special accumulator being inoperative when items are being listed and accumulated, and totalizing mechanism controlling both printing mechanisms and, when operated, arranged to render operative the printing mechanism of the special accumulator.

JESSE G. VINCENT.

Witnesses:
R. S. MIELERT,
AWAN MACAULEY.